United States Patent Office 3,494,573
Patented Feb. 10, 1970

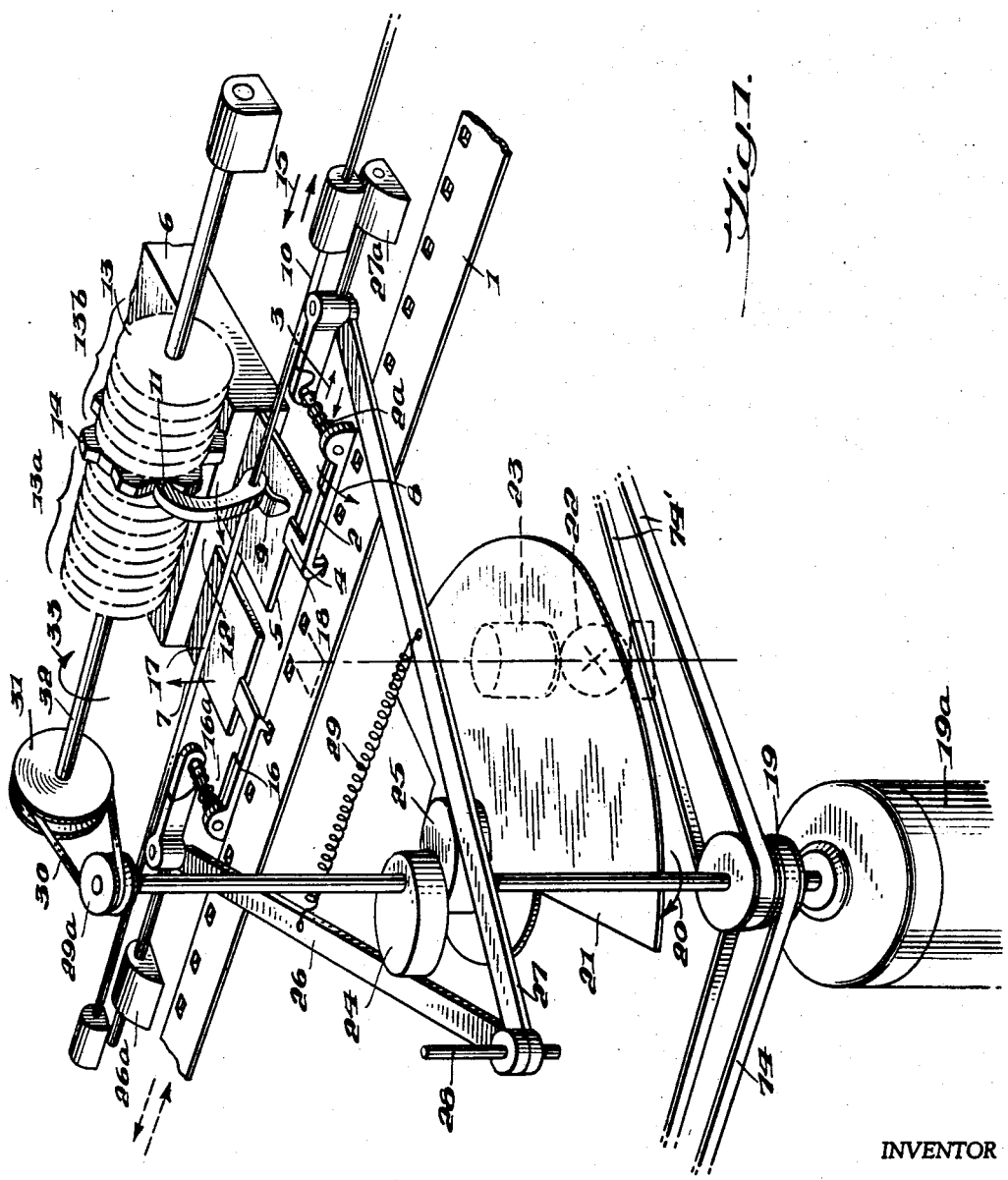

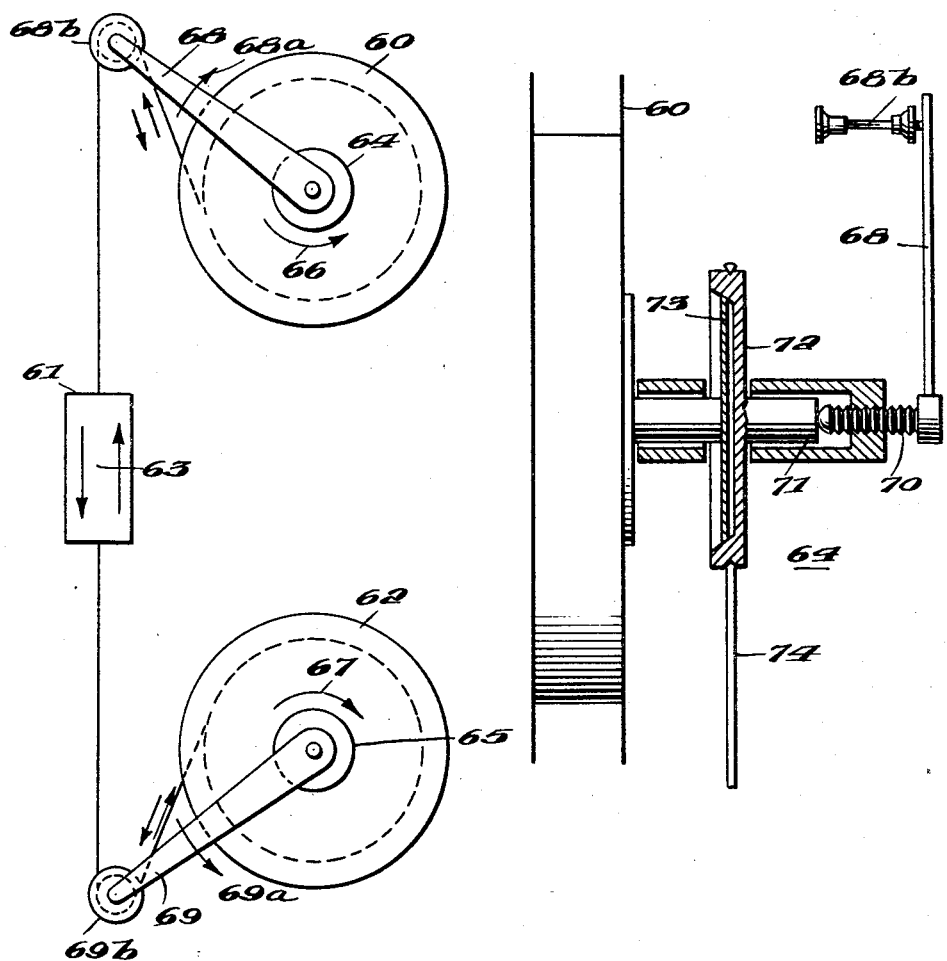

3,494,573
FILM FEEDING MECHANISM
Erwin Gerlach, Stockholm, Sweden, assignor, by mesne assignments, to Eastman Kodak Company, Rochester, N.Y., a corporation of New Jersey
Original application July 8, 1965, Ser. No. 480,218, now Patent No. 3,402,007, dated Sept. 17, 1968. Divided and this application May 26, 1966, Ser. No. 568,081
Claims priority, application Sweden, June 15, 1955, 5,619/55
Int. Cl. G03b 1/04
U.S. Cl. 242—202                    9 Claims

ABSTRACT OF THE DISCLOSURE

A motion picture projector has a claw-type pull-down mechanism for feeding film in forward and reverse directions at selectively different rates during constant speed operation of the projector motor. The film reels are tendency-driven by friction clutches continuously to cause each reel to be rotated in a film take-up direction so as immediately to take up film the instant the pull-down mechanism is adjusted to feed film thereto, this immediate take-up occurring without any shift in the drive arrangements for the reels. The friction clutches can be controlled by tension in the film so as to maintain film tension within predetermined limits.

CROSS-REFERENCES TO RELATED APPLICATIONS

This application is a division of my copending application Ser. No. 480,218, filed July 8, 1965, now Patent No. 3,402,007, which is a continuation of my prior copending application Ser. No. 125,583, filed July 20, 1961, for "Intermittent Film Feed Mechanism," now abandoned, which in turn was a continuation-in-part of my prior application Ser. No. 591,330, filed June 14, 1956, for "Image Frequency Control In Film Reproduction," now abandoned.

BACKGROUND AND SUMMARY OF THE INVENTION

This invention relates to film projectors, and particularly to film supply and take-up mechanisms operating in conjunction with a film catcher or claw mechanism.

In the reproduction of a film strip on a screen by known projectors having intermittent film feed mechanisms, variation in the frequency of frame change has been possible to some extent through control of the speed of the projector motor, such as through the use of series variable resistors. However, this has been possible within only narrow limits of frequency change because of the flicker which results when, for example, there is a substantial decrease in the frequency of frame change. Furthermore, control by this method involves accelerating and/or retarding rotating masses, and thus such control is not instantaneous.

In my copending application Ser. No. 480,218, I have disclosed and claimed an improved variable-rate film feed mechanism for film projectors which is capable of varying the frequency of frame change almost instantly over wide limits, including still projection, without stopping or varying the speed or direction of operation of the drive means for the feed mechanism and/or projector shutter. The mechanism is also capable of reversing the direction of film feed substantially instantly without changing the direction or speed of, or stopping, the drive means, and can achieve the aforesaid frequency variations during feeding of the film in either direction.

A primary object of the instant invention is to provide a projector with a film supply and take-up system which is capable of effecting substantially instantaneous film take-up on either film reel upon reversal of the direction of film feed and without the necessity of a drive shift from one reel to another.

Another object of the invention is to provide, in a motion picture projector having film supply and take-up reels, a film feeding apparatus wherein, for instance, the supply reel is tendency driven in a film take-up direction, and a reciprocating catcher member intermittently engages and advances the film in predetermined steps through the projector, thereby intermittently pulling film from the supply reel in substantially direct opposition to the tendency drive of the supply reel.

Another object of the instant invention is to provide such a film supply and take-up system which is capable of maintaining the film tension on each side of the feed mechanism within predetermined limits.

The novel features that I consider characteristic of my invention are set forth with particularly in the appended claims. The invention itself, however, both as to its organization and its operation, together with additional objects and advantages thereof, will best be understood from the following description when considered in connection with the accompanying drawings.

DESCRIPTION OF THE DRAWINGS

FIGURE 1 is a perspective view showing an intermittent film feeding mechanism constructed in accordance with an exemplary preferred embodiment of the invention claimed in my copending application Ser. No. 480,218, and of a preferred construction for use with and in the invention claimed in this application.

FIGURES 2 and 3 are schematic views which show a preferred embodiment of the reel supply and take-up system.

DESCRIPTION OF THE PREFERRED EMBODIMENT

Referring now to the drawings, particularly FIGURE 1, for purposes of clarity and simplication I have shown only those parts of a film projector which are essential to an understanding of the present invention. As shown in FIGURE 1, the film 1 is advanced intermittently by means of a catcher 2 which reciprocates in the directions indicated by the arrows 3. Any convenient form of mechanism for effecting the reciprocal movement of catcher 2 may be utilized, and an exemplary form as illustrated in the drawing will be described in detail below. The catcher 2 has a finger 4 which slides on a leaf spring 5 during the reciprocal movement of the catcher. The leaf spring 5 is fastened in a holder 6 and disposed so as to move the catcher 2 upwardly in the direction of arrow 7 away from the film 1 and against the weaker spring action of the helical spring 2a which is wound about the shaft carrying the catcher 2 and urging the catcher in the direction of the arrow 8, that is, into engagement with the film 1. Thus the catcher normally is biased into engagement with the film 1 by the spring 2a, and out of engagement with the film 1 by the leaf spring 5 acting upon the finger 4. The leaf spring 5 is stronger than the helical spring 2a, and accordingly the catcher 2 will move into engagement with the film 1 only when released by the spring 5.

To effect engagement of the catcher 2 with the film 1 means are provided for disabling or nullifying the effect of spring 5 according to a certain scheme. This includes a release lever 9 which is secured on a shaft 10 and rotatable therewith, and a cam lever 11 connected with the release lever 9 and adapted to turn the shaft 10. Movement of the cam lever 11 in the direction of the arrow 12 turns the release lever 9 downwardly and presses it against the leaf spring 5. This disables the leaf spring 5 and permits the helical spring 2a to bias the catcher 2 into engagement with the perforations in the film 1. As long as the cam lever 11 is not turned in the direction of the arrow 12, the release lever 9 remains in its upper position, and the leaf spring 5 restrains the catcher 2 from engaging the film perforations.

Periodic disabling of the leaf spring 5 so as to effect film engaging movement of the catcher 2 may be accomplished in several ways, but is attained according to the embodiment shown in FIGURE 1 through the use of a series of coaxial cam discs 13 mounted for rotation adjacent the cam lever 11. For clarity only one of the discs is shown as provided with cam lobes or surfaces 14 in FIGURE 1. It will be understood, however, that the others would normally have cam lobes or surfaces also, with the exception of a disc corresponding to zero frequency of frame change. As will be described hereinafter, the film projector according to the invention has shutter means for interrupting a light beam at a constant frame projection frequency, as is well known in the art. Each disc having cam surfaces or lobes would carry such a number of cam surfaces or lobes as to be operable upon selection to actuate the cam lever 11 at a predetermined aliquot part of the light interruption frequency or the catcher reciprocation frequency, which term includes the frame projection frequency or the catcher reciprocation frequency themselves. Thus at least one disc would carry a number of cam surfaces or lobes such as to actuate the cam lever 11 at each light interruption, which would provide the maximum frequency of frame change. The remaining discs 13 would each carry such a number of cam surfaces or lobes as to be operable upon selection to activate the cam lever 11 at lower frequencies, for instance, at every second light interruption, or at every third light interruption. Frame change frequency is dictated, of course, by the product of the revolutions per unit time performed by a cam disc and the number of cam lobes on the disc. As will be described further, the invention contemplates that the series of cam discs 13 be connected with the shutter to attain the necessary synchronizaion with the light interruptions, although the rotational speeds need not be identical.

Through relative axial displacement between the cam lever 11 on the shaft 10 and the series of cam discs 13, the frequency of frame change may be varied as desired. This relative displacement may be attained through axial displacement of the series of cam discs, through axial displacement of the cam lever 11 on the shaft 10, or, as illustrated in FIGURE 1, by axial displacement of the shaft 10 itself and the cam lever 11 therewith in the directions indicated by the arrows 15.

Reverse film feed can be attained by providing a second reciprocating catcher 16 actuated by a helical spring 16a and a leaf spring 17, corresponding respectively to helical spring 2a and leaf spring 5. As illustrated in FIGURE 1, the cam disc series includes two groups, group 13b for use during forward feed and group 13a for use during reverse feed. In each instance the number of cam discs corresponds to the desired number of frame change frequencies for each feed direction, and the configurations of the discs correspond to the particular frequencies desired. As illustrated, the lever 11 is displaced axially with the shaft 10. Consequently displacement of the shaft 10 from the forward feed discs to the reverse feed discs simultaneously carries the levers 11 and 9 from their operative position above the spring 5 to an operative position above the spring 17, whereby the forward catcher 2 is rendered inoperative and the backward catcher 16 is rendered operative to feed the film in a reverse direction at any selected frequency of frame change.

Each catcher is provided with an inclined face, as illustrated at 18 on catcher 2. The purpose of the inclined faces is to lower the accuracy requirements of the feed mechanism. As a result, the need for retracting the catcher from the film perforations at any precise moment is avoided, and the catcher will in fact slide out of the film during its return movement due to the inclination of the face 18. During this return movement the film will not be displaced where the bias of the helical spring 2a in the direction of the arrow 8 is so adjusted as to provide that the catcher is lifted upwardly by the small force resulting when it moves in a direction opposite to its feed direction. Moreover, when the catcher is in engagement with a perforation of the film and moving in a direction to advance the film, the total effect of the friction between the catcher and the film and the bias of the spring 2a is greater than the counter bias of the spring 5, and thus the spring 5 will not pull the catcher out of the film perforation during film advance even if the cam lever 11 is shifted to a second disc which does not have a cam lobe at the corresponding lateral position, so that the release lever 9 will be free to move upwardly. Thus momentary changes from one frequency to another are possible during mid-stroke of the film feed without the risk of there being only a partial frame change because the mechanism will complete the last film feed movement prompted by the first cam disc before starting a frame change frequency characteristic of the second cam disc.

Reciprocation of the catchers 2 and 16 in a film feeding direction may be accomplished in any of several ways. It is essential only that the catchers move in synchronism with the shutter so that film feed will occur only during light interruptions. According to the embodiment of FIGURE 1 the shutter system includes a shaft 19 rotated in the direction of the arrow 20 at a constant speed by the motor 19a. A shutter 21 is secured to the shaft 19 and accordingly rotates therewith at constant speed. A light source 22 and an optical device 23 for projecting a light beam on the film may be seen also in FIGURE 1. The shaft 19 carries two eccentric discs 24 and 25 which are disposed at 180° displacement from one another. Each disc cooperates with arms 26 and 27 mounted on a shaft 28. The arms 26 and 27 are also subjected to the bias action of spring 29 which urges the arms against the discs 24 and 25. The free end of arm 26 is connected with catcher 16, and the free end of arm 27 is connected with the catcher 2 such that as the shaft 19 rotates, a periodic reciprocating movement is imparted to each of the catchers in a film feed direction in synchronism with the rotational movement of the shutter 21. Means indicated schematically at 26a and 27a are provided for guiding the catchers in their respective film feed directions.

Synchronous rotation of the cam disc series 13 with the shaft 19 is attained through the driving disc 29a connected by means of the belt 30 with a driven disc 31 on the shaft 32 which carries the cam disc series 13. The shaft 32 is thus rotated in synchronism with the shutter in the direction of the arrow 33.

The operation of the system shown in FIGURE 1 will be apparent from the foregoing description. In summary, the shutter 21 is rotated at a constant speed so as to interrupt the light beam from light source 22 at a constant frequency. The catchers 2 and 16 are reciprocated back and forth in a direction to advance the film and at a frequency so as preferably to provide for advancing the film once during each light interruption. However, the frequency of frame change, or the rate at which the film is advanced, is governed by the speed and configuration of the particular cam disc with which the lever 11 cooperates. As pointed out previously, preferably one of the cam discs is so constructed as to effect engagement of the catchers with the film during each light interruption, and others of the discs are constructed so as to effect engagement of the catchers with the film at lower frequencies, that is, at every second light interruption, or at every third light interruption, etc. In the particular embodiment shown in FIGURE 1 this is accomplished by actuating or disabling the leaf spring 5 at predetermined intervals. Variations in the frequency of frame change are achieved by bringing the lever 11 into cooperative relationship with different cam discs. Reverse film feed is achieved by moving the lever 11 into cooperative relationship with any one of the discs of group 13a and with the leaf spring 17. At least one cam disc is constructed with a smooth configuration so as to avoid actuation of the lever 11 or the leaf springs, thus resulting in still projection without an any manner varying the rate or direction of movement of the shutter 21 or the catchers 2 and 16.

In order to provide for the film to be reeled on and off continuously and under proper tension during the displacements, special provision is made in the supply and take-up or reeling mechanism. The embodiment of this mechanism which is shown in FIGURES 2 and 3 also provides for instantaneous film take-up upon reversal of the film feed direction, and without necessitating a drive shift from one film reel to the other. In the arrangement of FIGURES 2 and 3, the film 1 moves from an upper reel 60 through the intermittent feed mechanism, represented schematically at 61, and onto a lower reel 62. The film will move at an assigned speed in either direction as indicated by the arrows 63. The reels 60 and 62 are continuously tendency driven in the direction of the arrows 66 and 67 such that each reel tends to charge itself with the film. Rotation of the reels is effected through friction clutches 64 and 65 which are driven continuously from the projector motor 19 by transmission belts 74 and 74', respectively.

Friction regulators 68 and 69 provide for adjusting the degree of frictional engagement mutually between each reel and the projector motor in response to changes in film tension between each reel and the intermittent feed mechanism. The respective regulators are subjected to turning forces in the directions of the arrows 68a and 69a respectively, for instance, by means of springs. Small film guide rollers 68b and 69b are mounted at the outer ends of the respective regulators 68 and 69.

FIGURE 3 illustrates in detail an arrangement by which the regulators ensure that the film will be wound or unwound at proper rates so as to maintain substantially constant tension on the film between the reels. In practice each of the rollers 68b and 69b is mounted in the plane respectively of its reel 60 or 62, but for purposes of illustration reel 60 and roller 68b in FIGURE 3 are shown in different planes. In FIGURE 3 the two plates or discs 72 and 73 comprise a friction clutch through which the projector motor 19a and the reel 60 or a reel spindle or support are operatively connected, the reel 60 or a reel spindle or support being coupled to the disc 73 and the disc 72 being rotated in the direction of arrow 66 of FIGURE 2 by means of transmission belt 74. The inner end of the regulator 68 carries a screw 70 which engages stud 71 on the disc 72. Axial adjustment of the screw increases or decreases the pressure bearing on the stud, and, in turn, the pressure exerted on the disc 72 of the friction clutch. Consequently if for some reason film above the intermittent feed mechanism 61 undergoes decrease in tension, the regulator 68 will turn in the direction of arrow 68a, and the screw 70 will move inwardly of the stud 71 to increase the pressure exerted on the disc 72 through the stud. The consequent adjustment in the degree of frictional engagement between the discs 72 and 73 will result in a tendency on the part of the reel 60 to wind up film in the direction of the arrow 66, and thus an increase in the tension exerted on the film above the mechanism 61 will occur. A similar effect would occur if for some reason the film between the mechanism 61 and the reel 62 were to undergo a decrease in tension, such as where the frequency of frame change remains for a time at a high value. In much the same manner, upon an increase in tension in the film between reel 60 and intermittent feed mechanism 61, regulator 68 would move in a counterclockwise direction, thus moving discs 72 and 73 apart so as completely to disengage the drive from the reel 60 and permit the reel 60 to unwind freely. Since both regulators operate simultaneously, film tension on each side of the mechanism can be maintained within predetermined limits. Since the film tension can be so controlled, upon reversal of the direction of film feed through the intermittent feed mechanism 61 there will be no delay in film take-up by the reel toward which the film is then being fed. Also, it will be noted that there is no drive shift from one reel to another upon reversal of the direction of film feed, but rather either reel is capable of substantially instantaneously shifting from a winding to an unwinding operation since each is continuously tendency-driven in the take-up direction.

Inasmuch as the screw 70 undergoes only small angular changes, it may conveniently be in the form of a multi-thread screw of the high pitch type. Or it may be constructed as merely a short section of a thread turn, for example, in the form of a stud sliding in a groove of corresponding pitch. This pitch may be varied along the groove.

Although I have shown my film reeling or take-up system used in conjunction with my new variable rate intermittent feed mechanism, it will be appreciated by those skilled in the art that this reeling or take-up system could be used in combination with any conventional feed mechanism.

Although I have shown and described certain specific embodiments of my invention, I am fully aware that many modifications thereof are possible, and my invention, therefore, is not to be restricted to the precise details of construction shown and described, but is intended to cover all modifications coming within the scope of the appended claims.

I claim:

1. A film feeding apparatus for a motion picture projector having a film gate, said apparatus comprising: a first rotatable reel support means adapted to receive a first film reel; a second rotatable reel support means adapted to receive a second film reel; an intermittent film feed mechanism comprising film catcher means adapted to reciprocate in a film advancing direction and to intermittently engage and disengage the film for selectively pulling film from a film reel on either of said support means and feeding it frame-by-frame through the film gate in an intermittent manner to a reel on the other of said reel support means so as to selectively advance film in different directions past the film gate; and means for rotatably driving each reel support means continuously in a direction to cause a film reel mounted thereon to be rotated in a film take-up direction so that either reel immediately begins to take up film the instant the direction of operation of said intermittent film feed mechanism is changed to feed film thereto, said drive means including a friction clutch associated with each reel support means having a driven member connected to said support means and a drive member frictionally coupled to said driven member, each of said clutches being adapted to create a braking force during pulling of film from its associated reel by the intermittent feed mechanism and being adapted to provide a drive coupling between said drive means and its associated reel for taking up film when said intermittent feed mechanism feeds film to its associated reel.

2. A film feeding apparatus for a motion picture projector having a film gate through which film is adapted to be advanced between two film reels, said apparatus comprising: a first rotatable film reel support means adapted to receive a first film reel; a second rotatable film reel support means adapted to receive a second film reel; drive means for rotatably driving each reel support means continuously in its film take-up direction; an intermittent film feed mechanism comprising film catcher means adapted for continuous reciprocation and intermitent film engagement for selectively pulling film from a reel on said first reel support means in substantially direct opposition to said drive means, and feeding it frame-by-frame through the film gate in an intermittent manner, to a reel on said second reel support means, or vice versa, at any one of a plurality of feed rates; [drive means for rotatably driving each reel support means continuously in its film take-up direction;] and means for variably coupling said first and second reel support means to said drive means in response to predetermined decreases and increases in film tension between said intermittent film feeding mechanism and reels mounted on said first and second reel support means.

3. A film feeding system as set forth in claim 2 wherein said means for variably coupling said reel support means to said drive means comprise friction clutch means between each reel support means and said drive means.

4. A film feeding system as set forth in claim 3 wherein said means for variably coupling said reel support means to said drive means includes movable film guide means for each reel support means biased in a film tensioning direction and connected with the friction clutch means for the respective reel support means.

5. A motion picture film handling and feeding mechanism for a motion picture projector having a film gate, said mechanism comprising: first and second film reel support means; drive means for driving each reel support means in its film take-up direction; feed means comprising film catcher means adapted for continuous reciprocation and intermittent film engagement for selectively pulling film from a reel on either of said support means in substantially direct opposition to said drive means and feeding the film in forward and reverse directions, frame-by-frame through the film gate and in intermittent manner, toward the other reel support means; and means for variably engaging and disengaging said drive means from said reel support means in response to predetermined decreases and increases in film tension between the feed means and respective ones of said reel support means, whereby there will be no delay in film take-up upon reversal of said feed means, and whereby film tension on opposite sides of said feed means is maintained within predetermined limits.

6. In a motion picture projector having a film gate through which film is adapted to be advanced between two film reels, the combination comprising: means for rotatably supporting each of the film reels for rotation in film feed-out and film take-up directions; tendency drive means tending to drive each of said film reels in a film take-up direction; and an intermittent film advancing mechanism comprising continuously reciprocable film catcher means adapted to intermittently engage the film for selectively pulling film from one or the other of said reels in substantially direct opposition to the tendency drive established by the last said means, and advancing film through the gate to the other of said reels.

7. In a motion picture projector having drive means and a film gate through which film is adapted to be advanced between two film reels, the combination comprising: means for rotatably supporting each of the film reels for rotation in film feed-out and film take-up directions; tendency means coupled to said drive means tending to drive each of said film reels in a film take-up direction; and an intermittent film engaging and advancing catcher mechanism coupled to said drive means for selectively pulling film from either of said reels in opposition to the tendency drive established by said tendency means, and advancing film through the gate to the other of said reels during continuous operation of said drive means and in the same drive direction thereof.

8. In a projector for projecting motion picture film and having film supply and take-up reels, the combination comprising: means for rotatably supporting the film reels for rotation in film feed-out and film take-up directions; an intermittent film advancing means including a catcher member reciprocally movable to intermittently engage and advance the film in predetermined steps to thereby intermittently pull film from the supply reel and advance it toward the take-up reel; and means for tendency driving said supply reel in a film take-up direction during each intermittent movement of said catcher member whereby said catcher member intermittently pulls film from said supply reel in substantially direct opposition to the tendency drive of said supply reel and intermittently moves the film toward the take-up reel to be taken up on the take-up reel; said tendency drive means being effective to establish a tendency pulling force on the film related to the intermittent pulling force of said film catcher member whereby intermittent movement of the film by said catcher member is less affected by reel inertia and film tension variations.

9. In a projector for projecting motion picture film and having film supply and take-up reels, the combination comprising: means for rotatably supporting the film reels for rotation in film feed-out and film take-up directions; an intermittent film advancing means including a catcher member reciprocally movable to intermittently engage and advance the film in predetermined steps to thereby intermittently pull film from the supply reel and advance it toward the take-up reel, said catcher member being the sole driving force pulling film from said supply reel; and means for tendency driving said supply reel in a film take-up direction during such intermittent movement of said catcher member whereby said catcher member intermittently pulls film from said supply reel and intermittently moves the film toward take-up reel to be taken up on the take-up reel; said tendency drive means being effective to establish a tendency pulling force on the film related to the intermittent pulling force of said film catcher member whereby intermittent movement of the film by said catcher member is less affected by reel inertia and film tension variations.

References Cited
UNITED STATES PATENTS

| 2,745,604 | 5/1956 | Masterson | 242—55.12 |
| 3,151,820 | 10/1964 | Bahring et al. | 242—55.12 |
| 2,588,813 | 3/1952 | Dube | 352—173 |

LEONARD D. CHRISTIAN, Primary Examiner

U.S. Cl. X.R.

226—54

PO-1050
(5/69)

UNITED STATES PATENT OFFICE
CERTIFICATE OF CORRECTION

Patent No. 3,494,573        Dated Feb. 10, 1970

Inventor(s) Erwin Gerlach

It is certified that error appears in the above-identified patent and that said Letters Patent are hereby corrected as shown below:

Column 2, line 20, change "particularly" to --particularity--. Column 3, line 42, change "synchronization" to --synchronization--. Column 5, line 9, after "without" change "an" to --in--. Column 7, lines 5-7, delete "[drive means for rotatably driving each reel support means continuously in its film take-up direction;]".

SIGNED AND
SEALED
AUG 18 1970

(SEAL)
Attest:

Edward M. Fletcher, Jr.
Attesting Officer

WILLIAM E. SCHUYLER, JR.
Commissioner of Patents